United States Patent [19]

Vanduyn

[11] Patent Number: 4,922,146
[45] Date of Patent: May 1, 1990

[54] COOLING ARRANGEMENT FOR A DC MOTOR

[75] Inventor: Martin Vanduyn, Peterborough, Canada

[73] Assignee: General Electric Canada Inc., Mississauga, Canada

[21] Appl. No.: 327,447

[22] Filed: Mar. 22, 1989

[30] Foreign Application Priority Data

May 19, 1988 [CA] Canada .................................. 567253

[51] Int. Cl.⁵ .............................................. H02K 9/00
[52] U.S. Cl. .................... 310/59; 310/60 R; 310/64; 310/227
[58] Field of Search .................... 310/58, 59, 60 R, 61, 310/52, 53, 55, 57, 64, 65, 46, 154, 177, 227, 233, 261

[56] References Cited

U.S. PATENT DOCUMENTS

| 2,489,109 | 11/1949 | Shildneck | 310/57 |
| 2,683,227 | 7/1954 | Beckwith | 310/64 |
| 4,119,873 | 10/1978 | Sakurai | 310/227 |

FOREIGN PATENT DOCUMENTS 1024576 1/1978 Canada .
1042968 11/1978 Canada .
0199450 12/1982 Japan .................. 310/227

Primary Examiner—R. Skudy
Attorney, Agent, or Firm—Edward H. Oldham; Craig Wilson

[57] ABSTRACT

A commutator type, prior art dynamoelectric machine normally has an inlet for cooling air at the end of the machine remote from the commutator. The air flows from the inlet through axially extending passages in the rotor, outwardly through spaced radial ducts in the rotor, and into the air gap. Part of the air flows through the air gap to a collecting chamber at the commutator end of the machine to be discharged or exhausted. Part of the air flows radially outwards through interpolar spaces in the stator, through cooling ducts in the magnet frame to a peripheral passage which is connected to the collecting chamber at the commutator end. This invention provides a second collecting chamber at the drive end of the machine opposite the commutator end, communicating with the air gap and also with the peripheral passage at the drive end. Thus the air flow is divided after passing through the rotor and flows to the nearer collecting chamber providing a shorter flow path.

5 Claims, 3 Drawing Sheets

28 → TO ATMOSPHERE

COOLING ARRANGEMENT FOR A DC MOTOR

BACKGROUND OF THE INVENTION

This invention relates to the cooling of a direct current type dynamoelectric machine and in particular it relates to an improved means for cooling a commutator type direct current dynamoelectric machine.

In an AC machine, air or other cooling gas can be introduced into the machine at either or both ends of the machine and passed radially outwards through cooling passages for discharge or recirculation. In a direct current or DC machine with a relatively large commutator at one end, it is very difficult and undesirable to bring air (or other cooling gas) equally from both ends of the rotor. Consequently it has been the practice to introduce the air at the end of the machine remote from the commutator and to discharge it at the commutator end. Carbon dust from the commutator brushes is thus conveniently carried away from the machine. In these prior machines air is introduced into axially extending passages in the rotor spider and travels radially outwards through spaced ducts in the rotor core to the air gap between the stator and the rotor. The air travels, in part, through the air gap to the commutator end where it enters a collecting chamber which communicates with an exhaust. A portion of the air may travel from the air gap radially outwards through interpolar spaces and from there both axially in the interpolar spaces and outwards through openings into a peripheral axial passage. Both the interpolar spaces and the peripheral spaces communicate with the collecting chamber at the commutator end. There are pressure drops along the rotor passages and along the air gap path, as well as in the peripheral passage. Consequently the flow of air is not equal along the axis, and there tends to be regions of higher temperatures. It is, of course, desirable to have uniform temperatures axially along the rotor and stator cores.

Canadian Patent No. 1,024,576 issued on Nov. 7, 1978 to Anil K. Mishra, describes an apparatus for reducing this problem. The air passage which extends between the spider arms of the rotor is tapered. This is intended to provide a constant static pressure along the axially extending rotor passage and thus create a more uniform radial flow through the rotor core by reducing the so-called "manifold effect" at the inlet side of the radial passages. However it has been found that this occurs only when the cross-sectional area of the tapered passage is relatively small. The path of cooling air is along this axial passage, radially outwards through ducts in the rotor core, and then along the air gap. The cross-sectional area of the rotor passages is normally large in comparison to the cross-sectional area of the air gap flow path, and the more severe manifold effect occurs in the air gap. The non-uniformity of static pressure in the air gap is particularly severe in more recent machine designs which tend to have a relatively long axial dimension. Consequently the use of a tapered air passage in the rotor is of limited value because it provides desirable results only when the rotor air passage is relatively small or conversely the air gap is unusually large. It is, of course, difficult to increase the size or magnitude of the air gap without a severe reduction in electromagnetic performance. Some of the air flow is outwards from the air gap through the stator and through the peripheral passage. The peripheral passage is usually of relatively large cross-sectional area and there is a very much smaller manifold effect, but this may also be reduced by the present invention.

The present invention seeks to reduce the manifold effect in the air gap by reducing significantly the maximum axial velocity of the air in the air gap.

SUMMARY OF THE INVENTION

The present invention provides a flow path from the rotor passages radially outwards through spaced ducts in the rotor core, as before, but then the path divides at the air gap so that the flow is outwardly from substantially the center of the air gap towards both the commutator end and the drive end (the end remote from the commutator end). This reduces the length of the path that the air must flow in the air gap before it is discharged and reduces the maximum axial velocity of the air by a factor of two. It will be recalled that a portion of the air flows into the interpolar spaces. Some of this flows axially and some flows outwardly through openings in the magnet frame to a peripheral passage. The portion of air which flows axially in the interpolar spaces is also divided which reduces the length of these paths and the axial velocity. The portion of the air which flows axially in the peripheral passage is relatively small, and the effect of dividing the flow is not as significant, however this flow may also be divided if desired. The reduction in the length of the air path and the reduction of the maximum axial velocity, particularly in the air gap, reduces the pressure drop and the flow becomes more uniform. This results in improved cooling.

It is therefore an object of the invention to provide an improved cooling arrangement for a DC dynamoelectric machine.

It is another object of the invention to provide in a dynamoelectric machine having a commutator, a flow path of reduced length to reduce the axial velocity of cooling gas and the pressure drop in the cooling system.

It is yet another object of the invention to provide a DC motor having a flow path for cooling air, which flows radially through the rotor core to the air gap, and that is then caused to divide in the air gap and interpolar spaces to flow towards both ends of the machine to improve the cooling.

Accordingly there is provided a cooling arrangement for a commutator type dynamoelectric machine having a rotor mounted for rotation within a stator, axially extending passage means in the rotor communicating with inlet cooling gas means and with spaced radial ducts in the core of the rotor, the spaced radial ducts communicating with an air gap between the rotor and stator, said arrangement comprising a first collecting chamber at the commutator end of the machine communicating with the air gap, and a second collecting chamber at the drive end of the machine communicating with the air gap, and discharge passage means communicating with both the first and second collecting chambers, a flow path for the cooling gas being from the inlet cooling gas means through the axially extending passage means, the radial ducts, and to the air gap, the flow in the air gap being in both directions to a respective one of the first and second collecting chambers and discharge passage means.

BRIEF DESCRIPTION OF THE DRAWINGS

The invention will be described with reference to the accompanying drawings, in which FIGS. 4a, 5b, and 6b are graphs representing the same conditions in a machine according to the invention.

DESCRIPTION OF THE PREFERRED EMBODIMENT

Figure 1:
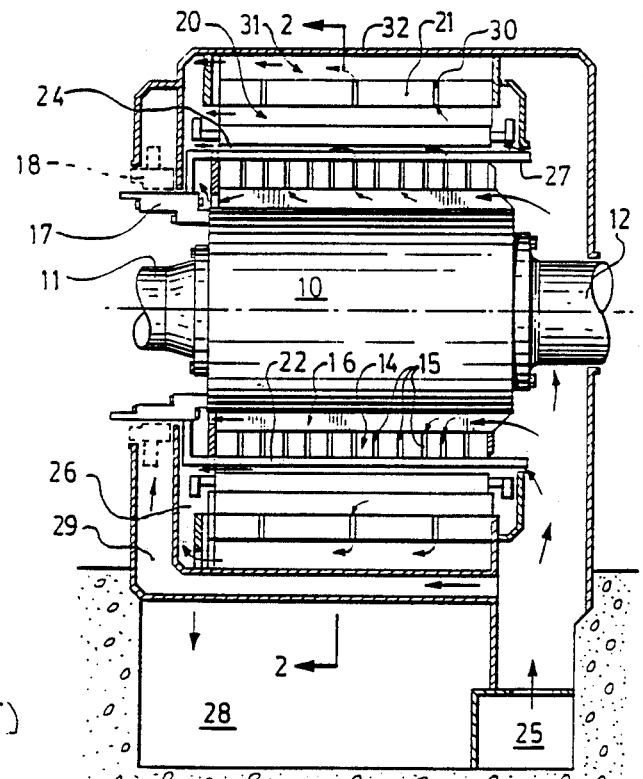
FIG. 1 is a sectional side view of a DC machine showing a prior art cooling arrangement.
Figure 2:
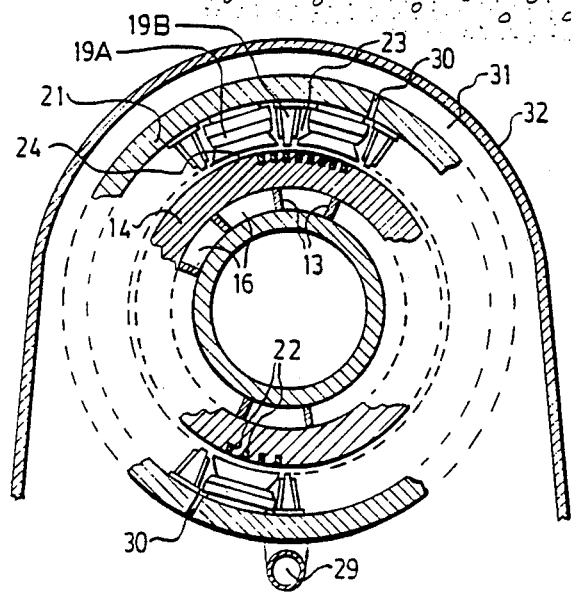
FIG. 2 is a sectional view, taken along line 2—2 of FIG. 1.

Referring to FIGS. 1 and 2, there is shown a prior art commutator type dynamoelectric machine having a rotor 10 mounted on a shaft 11 having a driving end 12, that is an end 12 normally connected to drive a load. The rotor core 14 is comprised of groups of laminations having radially extending ducts or passages 15. Cooling passages 16 extend axially in the rotor 10, between the rotor's spider arms 13. A commutator 17 is at the end of rotor 10 remote from the drive end. A commutator brush assembly 18 is indicated by broken lines. Rotor conductors 22 extend through slots in the rotor core laminations and connect with commutator 17 at one end. End turns are indicated at 27. A stator 20 has a magnet frame 21 from which are mounted poles 19A and interpoles 19B with windings. Interpolar spaces 23 communicate with air gap 24 defined by the rotor and the faces of the poles 19A and 19B. The general design of such machines is known.

The cooling arrangement for the machine of FIGS. 1 and 2 has an inlet passage 25 for air (or other cooling gas). The flow path for the cooling air is indicated by arrows. The main flow path is from inlet passage 25, into cooling passages 16, and radially outward through ducts 15, into air gap 24. The main flow is then through the air gap 24 into collecting chamber 26 at the commutator end. It will be understood that the collecting chamber 26 extends around the machine and includes a discharge port or exhaust in the lower region of chamber 26 which empties into or communicates with a space or chamber 28 over which the machine is mounted.

A portion of the air from air gap 24 flows radially outwards into interpolar spaces 23. Some of this air flows axially in the interpolar spaces to collecting chamber 26, and a minor portion flows through openings 30 in magnet frame 21 into peripheral passage 31. The peripheral passage 31 is between the magnet frame 21 and a cover or outer shroud 32. The peripheral passage 31 communicates with collecting chamber 26 and space or chamber 28. Air from peripheral passage 31 flows into collecting chamber 26 and space or chamber 28. In addition, some air from inlet passage 25 flows through a cooling duct 29 to the commutator brush assembly 18 and commutator 17 for cooling.

Figure 3:
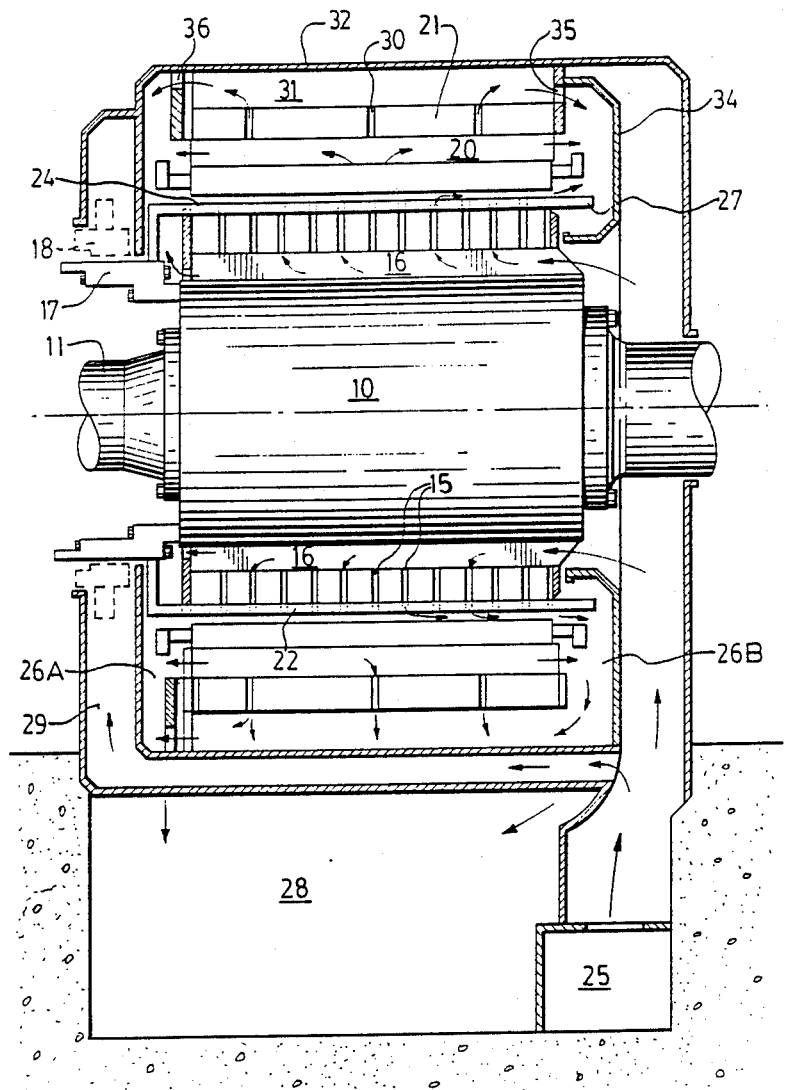
FIG. 3 is a sectional side view of a DC machine showing a cooling arrangement in accordance with the invention.

Referring to FIG. 3, there is shown a sectional side view of a commutator type dynamoelectric machine generally similar to that of FIGS. 1 and 2, but with an improved cooling arrangement. Like parts of the FIG. 3 machine bear like designation numbers. As before, rotor 10 is mounted on shaft 11 for rotation within stator 20. The rotor 10 and stator 20 are separated by air. Cooling passages 16 extend axially in the rotor 10 and radially extending ducts 15 are provided at spaced locations in the rotor core 14. There are also openings 30 which are radial openings, extending axially, and are provided at spaced intervals in the magnetic frame 21. There is a commutator 17 and a brush assembly 18. All this is similar to the structure described in connection with FIGS. 1 and 2.

However, in the machine of FIG. 3, an inner wall assembly or inner shroud 34 has been added. This forms a collecting chamber 26B at the drive end. The collecting chamber at the commutator end has been designated 26A in FIG. 3. The inner shroud 34 extends around the machine, clear of the communicating region between cooling passages 16 and inlet 25, and it is connected to communicate with space or chamber 28. Thus, there is a collecting chamber 26A on the commutator side and a collecting chamber 26B on the drive end, each communicating with, and each discharging into space or chamber 28. Preferably the collecting chambers 26A and 26B have substantially equal pressures so that the air flow in air gap 24 and collecting chambers 26A and 26B is substantially equally divided. Thereby the maximum axial air velocity in the air gap 24 is reduced by a factor of two in comparison with conventional prior art design. In FIG. 3 a passage 35 may be used to provide communication between the drive end of peripheral passage 31 and collecting chamber 26B. It was previously indicated that only a minor portion of cooling air flows axially in peripheral passage 31, and consequently the use of a passage 35 to provide divided flow in peripheral passage 31 adds relatively little advantage, but may be used if desired.

The air flow path is from inlet passage 25 and the air enters cooling passages 16, then through radially extending ducts 15 to air gap 24. The air may now flow in the air gap 24 towards the nearer of chambers 26A and 26B, both of which have a lower pressure than the air in passage 16 because they are both connected with space or chamber 28. It is known to provide a pressure differential between inlet and discharge of a dynamoelectric machine using an external fan or to use fan blades mounted on the machine rotor. This is not part of the present invention. It is understood that the air at inlet passage 25 is provided at a pressure above atmosphere and space or chamber 28 may discharge to atmosphere or be connected to filter means, and a fan to recirculate the air to inlet passage 25. It will be seen that because the air flows through the air gap 24 towards the nearer chamber 26A or 26B, the farthest the air must flow through the air gap 24 is now one half the length of the rotor instead of the full length of the rotor, and the maximum axial air velocity is now one half of the axial velocity in prior designs.

Some of the air flows from the air gap 24 radially outwards through interpolar spaces 23 and opening 30 into peripheral passage 31. From peripheral passage 31 the air flows through passage 36 into collecting chamber 26A (if there is no passage 35 in use). If a passage 35 has been used, the air flow will divide in peripheral passage 31 and flow to the nearer passage or opening 36 and 35 and into respective collecting chamber 26A and 26B for discharge into space or chamber 28. Also, some of the air flows through the interpolar spaces 23 axially to the nearer one of collecting chambers 26A and 26B. As before, a portion of the air from inlet passage 25 through commutator cooling duct 29 for cooling the commutator 17 and brush assembly 18.

Figure 4A:
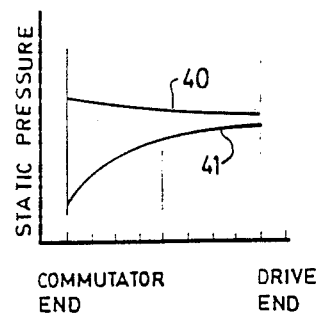
FIGS. 4a, 5b, and 6a are graphs representing various conditions in a typical prior art machine.

The cooling of the rotor core 14 is determined mainly by the flow of cooling air through radial radially extending ducts 15. In turn, the magnitude of this air flow is determined not by the absolute pressures involved but by the pressure difference between the cooling passage 16 and the air gap 24 with respect to each radially extending duct 15. Referring to FIG. 4a, which shows static pressure plotted against position along the axis of the rotor, the curve 40 represents the pressure in the cooling passage 16 (FIGS. 1 and 2) and the curve 41 represents the pressure in the air gap 24 (FIGS. 1 and 2). The pressure drop along the air gap 24 is, of course, considerably greater because of its smaller size. The pressure difference, that is the difference between curves 40 and 41, is represented by curve 42 in FIG. 5a. Curve 42 therefore represents the airflow through radially extending ducts 15 against the axial position of the duct along the rotor core.

Figure 6A:
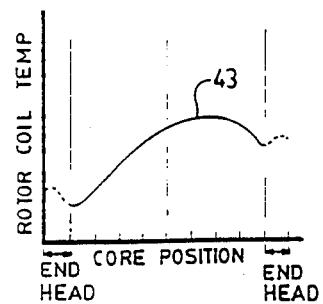

Referring to FIG. 6a, there is shown a graph of rotor coil temperature against the axial position along a rotor core for a prior art motor of the type described with reference to FIGS. 1 and 2, operating at rated load. The curve 43 thus represents core temperatures with the air entering from the right side or drive end.

Figure 4B:
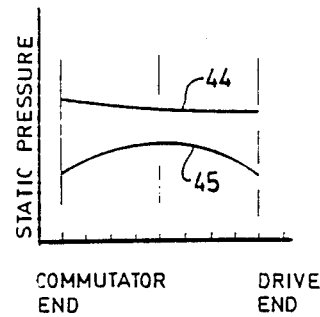
Figure 5A:
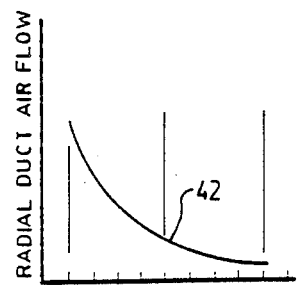
Figure 5B:
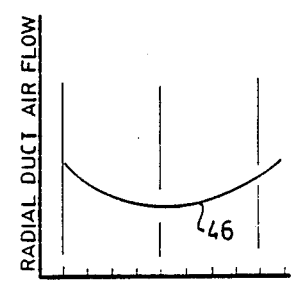
Figure 6B:
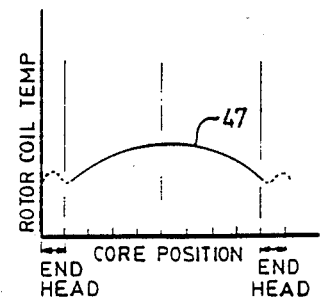

Referring to FIGS. 4b, 5b and 6b, there are curves shown which represent similar values to the curves of FIGS. 4a, 5a and 6a, but the curves in FIGS. 4b, 5b and 6b relate to a machine according to the invention where the air flow in the air gap, interpolar spaces, and if desired also the peripheral passage, is divided. It will be seen that the static pressures in FIG. 4b, represented by curves 44 and 45, for the pressures in cooling passage 16 and air gap 24, are more evenly distributed because of the divided air flow in the air gap 24. As a result, the air flow in the radially extending ducts 15, as represented by curve 46, FIG. 5b, has relatively little difference between the drive end and the commutator end of the rotor core.

In FIG. 6b, which shows rotor coil temperature plotted against axial core position, the curve 47 shows a lower maximum temperature and a more even temperature distribution than curve 43 (FIG. 6a) of a generally similar prior art machine. The design of the DC machine must be based on the highest operating temperatures, and it is therefore desirable to have as low an operating temperature as possible with as few peaks as possible. Thus the reduction of maximum operating temperatures is of importance.

It is believed that the preceding description will provide a proper understanding of the invention, which will be defined in the appended claims.

What I claim as new and desire to secure by Letters Patent of the United States of America is:

1. A cooling arrangement for a commutator type dynamoelectric machine having at one end thereof a commutator, a rotor mounted for rotation within a stator, axially extending cooling passage means in said rotor communicating with inlet gas cooling means at a drive end of said machine opposite the commutator end of said machine and with spaced radially extending ducts in said rotor, the spaced radially extending ducts in said rotor communicating with an air gap between said rotor and said stator, said arrangement comprising
    a first collecting chamber at said commutator end communicating with said air gap, and a second collecting chamber at said drive end communicating with said air gap, and
    chamber means communicating with both said first and second collecting chambers for receiving gas therefrom and discharging said gas, the main flow of gas from said inlet gas cooling means being through said axially extending cooling passage means, said radially extending ducts in said rotor, and to the air gap, the flow in the air gap being in both axial directions to a respective nearer one of said first and second collecting chambers and into said chamber means for providing a shorter path and a reduced velocity for the flow of cooling gas.

2. A cooling arrangement as defined in claim 1 wherein said stator comprises a magnet frame, poles and interpoles spaced around said magnet frame and directed inwardly of said frame, said poles and interpoles defining interpolar spaces, said interpolar spaces communicating with said air gap, said cooling arrangement further comprising
    a peripheral passage outwardly of said magnet frame and extending around said machine, said peripheral passage communicating with said first and second collecting chambers at respective sides of said peripheral passage,
    said magnet frame having openings spaced radially and extending axially between said interpolar spaces and said peripheral passage, a portion of the cooling gas from said air gap flowing through said interpolar spaces and said openings into said peripheral passage and flowing to the nearer one of said first and second collecting chambers.

3. A cooling arrangement for a commutator type dynamoelectric machine having at one end thereof a commutator, a rotor mounted for rotation within a stator, said machine having a drive end opposite said commutator end, axially extending cooling passages in said rotor communicating with an inlet for a cooling gas at said drive end of said machine and with spaced radially extending ducts in said rotor, the spaced radially extending ducts communicating with an air gap between said rotor and said stator, said stator comprising a magnet frame, poles and interpoles spaced around said frame and directed inwardly of said frame, said poles and interpoles defining interpolar spaces, said interpolar spaces communicating with said air gap, the arrangement comprising
    a shroud surrounding said magnet frame and defining with said magnet frame a peripheral passage,
    spaced radially directed and axially extending openings in said magnet frame communicating with said interpolar spaces and said peripheral passage,
    said shroud extending around said commutator end of said machine and defining therewith a first collecting chamber communicating with said air gap, said interpolar spaces and the commutator end of said peripheral passage,
    an inner shroud extending around said drive end of said machine and defining therewith a second collecting chamber communicating with said air gap and said interpolar spaces, and
    chamber means communicating with both said first and second collecting chambers and with atmosphere.

4. A cooling arrangement as defined in claim 3 in which said second collecting chamber also communicates with the drive end of said peripheral passage to provide a divided flow of cooling gas in said peripheral passage.

5. A cooling arrangement for a DC motor having a rotor including a rotor core mounted for rotation within a stator, said stator having a cylindrical magnet frame with poles and interpoles mounted thereto and directed inwardly of said frame, said poles and interpoles defining therebetween interpolar spaces, the inner ends of said poles and interpoles defining with said rotor an air gap, a commutator at a first end of said motor, axially extending cooling passages within said rotor, spaced radially extending ducts in said rotor core communicating with said cooling passages in said rotor and with said air gap, a shroud outwardly of said magnet frame and defining therewith a peripheral passage, radially directed and axially extending spaced openings in said magnet frame communicating with said interpolar spaces and with said peripheral passage, said interpolar spaces communicating with said air gap, said arrangement comprising said shroud extending around said first end of said motor and defining with said motor a first collecting chamber communicating with said air gap, said interpolar spaces at said first end and said peripheral passage at said first end, an inner shroud extending around the drive end of said motor, opposite said first end, and defining with said motor a second collecting chamber communicating with said air gap, said interpolar spaces at said drive end and said peripheral passage at said first end, air inlet passage means communicating with said cooling passages in said rotor at said drive end for introducing air into said cooling passages, the flow of air from said air inlet passage means passing through said cooling passages in said rotor, said radially extending ducts in said rotor core to said air gap, a portion of said air dividing and flowing through said air gap in either direction to the respective nearest one of said first and second collecting chambers, and a portion flowing from said air gap through said interpolar spaces to a respective nearest one of said first and second collecting chambers, and chamber means communicating with both said first and second collecting chambers for receiving and discharging collected air.

* * * * *